No. 739,980. PATENTED SEPT. 29, 1903.
C. F. BRYANT.
EDUCATIONAL APPLIANCE FOR DENTAL STUDENTS.
APPLICATION FILED JAN. 12, 1903.
NO MODEL. 2 SHEETS—SHEET 1.
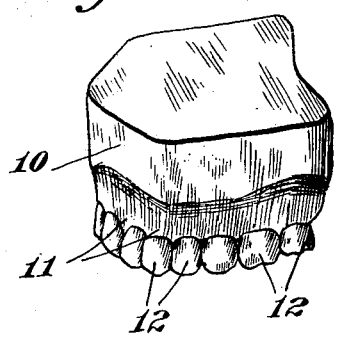
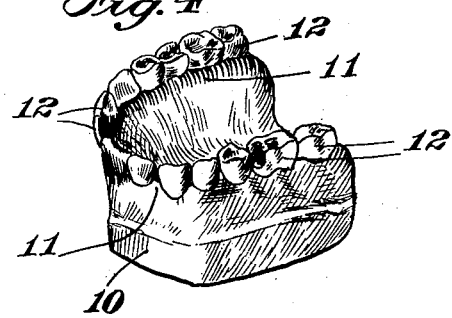
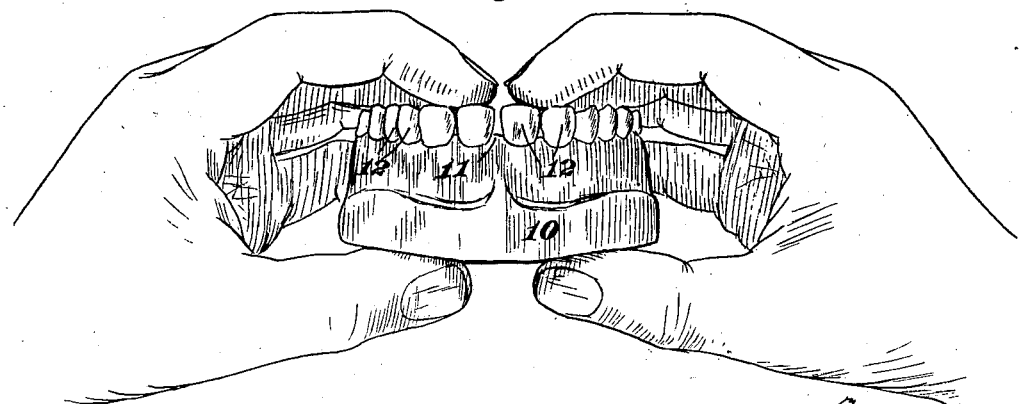
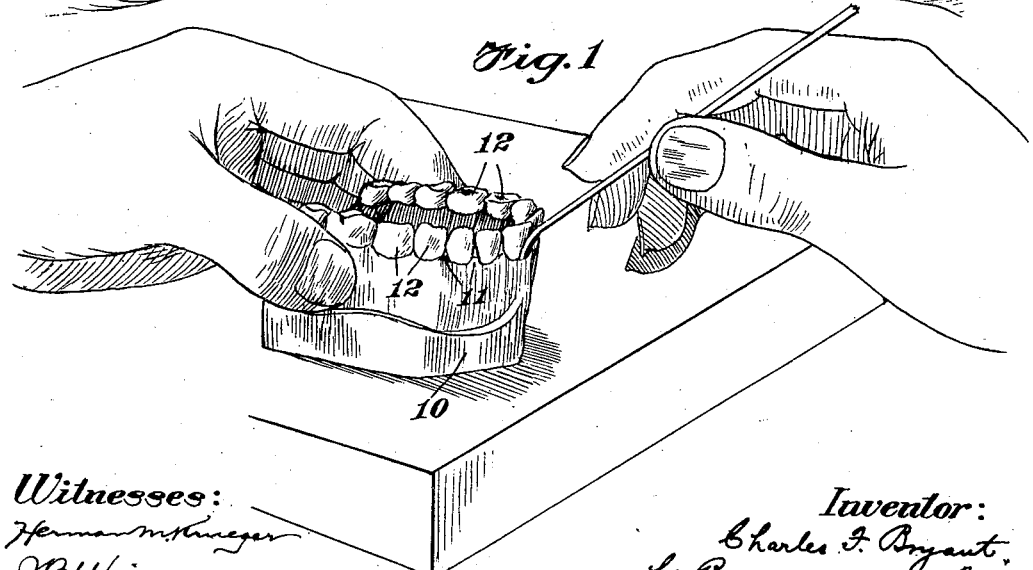

No. 739,980. PATENTED SEPT. 29, 1903.
C. F. BRYANT.
EDUCATIONAL APPLIANCE FOR DENTAL STUDENTS.
APPLICATION FILED JAN. 12, 1903.
NO MODEL. 2 SHEETS—SHEET 2.
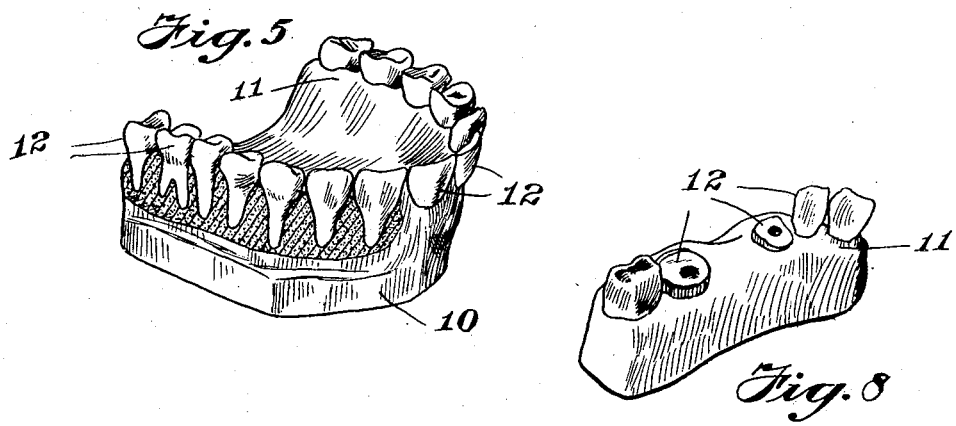
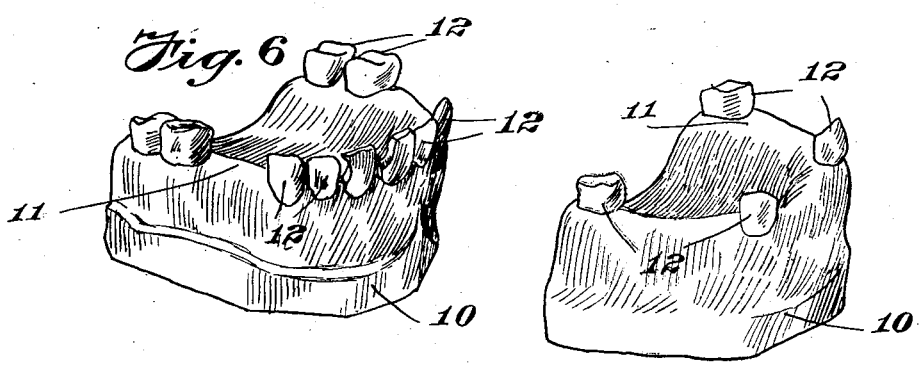
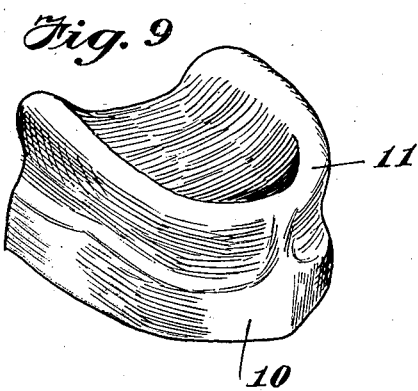
Witnesses:
Herman M. Krueger
J. B. Weir
Inventor:
Charles F. Bryant,
by Bond, Adams, Pickard & Jackson
his Attys No. 739,980. Patented September 29, 1903.

UNITED STATES PATENT OFFICE.

CHARLES F. BRYANT, OF CHICAGO, ILLINOIS.

EDUCATIONAL APPLIANCE FOR DENTAL STUDENTS.

SPECIFICATION forming part of Letters Patent No. 739,980, dated September 29, 1903.

Application filed January 12, 1903. Serial No. 138,682. (No model.)

*To all whom it may concern:*

Be it known that I, CHARLES F. BRYANT, a citizen of the United States, residing at Chicago, in the county of Cook and State of Illinois, have invented certain new and useful Improvements in Educational Appliances for Dental Students, of which the following is a specification, reference being had to the accompanying drawings.

My invention relates to educational appliances, and has for its object to provide means whereby dental students may readily familiarize themselves with all the different operations required in the practice of dentistry without operating on living subjects. Artificial teeth have heretofore been made of substances too hard to be cut or have cavities formed in them by the students for experimental work, and consequently the student has had no way of familiarizing himself with the various operations of dentistry except by observation or by experiment on a living subject, which for obvious reasons is highly objectionable, particularly to the patient. Moreover, in actual dental operations on a patient the progress of the work as it is being done cannot be readily observed except by the operator, so that it is difficult for students to secure more than a theoretical knowledge of the art from the sources of instruction heretofore available.

By my invention I provide means whereby each student may not only observe the various operations of dentistry as performed by skilful dentists, but may also practice them himself at pleasure without the necessity of procuring a living patient.

To this end my invention consists, first, in providing a jaw substantially the same in shape as the human jaw, so far as the gum is concerned, the gum being formed of slightly flexible material, so as to simulate the human jaw in that respect; second, in fitting in said jaw teeth with roots formed in simulation of the natural teeth, the roots being embedded in the jaw in substantially the natural way, so that the student can operate upon them in the same way as upon a living patient; third, in constructing the teeth of hard rubber or equivalent substance, so that they may be cut out and cavities formed in them similar to cavities formed in human teeth, and thus provide for experimental fillings similar to those encountered in the practice of dentistry, and, fourth, in constructing the jaw so that it can readily be supported and operated upon by the student.

In the accompanying drawings, Figure 1 is a perspective view of my improved appliance as it would appear when in use. Fig. 2 is a front elevation illustrating the fact that the teeth are flexibly supported, so that they may be separated for filling purposes. Fig. 3 is an inverted perspective view. Fig. 4 is a perspective view showing a cavity formed in one of the molars. Fig. 5 is a perspective view, part of the gum being cut away to show the roots embedded therein. Figs. 6 and 7 are perspective views showing jaws arranged for different dental operations. Fig. 8 is a partial view of a jaw, the canine and one of the molars being cut off and bored for bridgework; and Fig. 9 is a perspective view of a toothless jaw.

Referring to the drawings, 10 indicates the jaw, and 11 the gum. The jaw and gum may be of rubber cast in one piece and vulcanized sufficiently to secure the requisite rigidity but not sufficiently to destroy all their elasticity. The bottom of the jaw is flat, as best shown in Fig. 3, to adapt it to rest on a table or other suitable support, so that it may readily be held in position by the student with his left hand, while he operates on it with his right. The toothless jaw (shown in Fig. 9) is employed for teaching students how to construct and fit teeth on plates, and as the appliance is an accurate reproduction of the human gums and palate the student is enabled to thoroughly familiarize himself with the different operations of making and fitting sets of teeth.

For the purpose of teaching filling operations the jaw is provided with teeth 12, made of rubber and vulcanized until they are hard and substantially inflexible. The teeth are constructed in shape corresponding to the natural teeth with roots which are embedded in the gums, as best shown in Fig. 5. In practice the jaw with teeth is formed by first making the teeth and setting them in a mold having recesses to hold the teeth in their proper positions. Portions of rubber are packed around the roots and the whole is then clamped together and heated in a vulcanizer until the jaw is of the desired stiffness. The teeth are thus embedded firmly in the jaw and have the appearance of natural teeth. Owing to the elasticity of the material, however, the teeth may be wedged apart in the same manner as natural teeth to permit of different filling operations. Moreover, that portion of the rubber representing the gums may be pressed away from the teeth, as indicated in Fig. 1, by a suitable instrument and the teeth filled below the gum, as is frequently necessary in practice.

In Fig. 6 I have shown cavities in the incisors to illustrate the adaptability of the appliance for use in experimental work corresponding to actual dental operations. For the same purpose I have illustrated in Fig. 8 a portion of a jaw prepared for a bridge. If desired, my improved appliance may be employed for illustrating the most improved methods of extracting teeth and, in fact, for practically all dental operations. It is most useful, however, for illustrating the formation and filling of cavities, since the preparatory work, as well as the work of filling for gold, silver, or porcelain inlay fillings, differs materially, and by providing means whereby the student can accurately observe the work of the most expert operators during the entire operation and practice it himself afterward he is given the important advantage of actual practical experience before operating on a patient, which he could not otherwise obtain.

While I prefer to use vulcanite, any other equivalent material may be employed. Furthermore, while it is preferable to embody my invention in a form constructed to conform in shape to a complete human jaw, so far as the teeth and gum are concerned, my improvements may be applied to portions of a jaw, as illustrated in Fig. 8, and such portions may be of greater or less extent.

That which I claim as my invention, and desire to secure by Letters Patent, is—

1. An educational appliance, comprising a form similar in shape to the gum of the human jaw, and formed of slightly flexible material, substantially as described.

2. An educational appliance, comprising a form similar in shape to the gum of the human jaw and formed of slightly flexible material, said form having a flat base, to adapt it to rest on a suitable support, substantially as described.

3. An educational appliance, comprising a relatively soft artificial tooth adapted to be cut by dental instruments, and a suitable support for said tooth, substantially as described.

4. An educational appliance, comprising a relatively soft artificial tooth adapted to be cut by dental instruments, and a suitable support for said tooth, said tooth having a root embedded in said support, substantially as described.

5. An educational appliance, comprising a relatively soft artificial tooth adapted to be cut by dental instruments, and a flexible support for said tooth, said tooth having a root embedded in said support, substantially as described.

6. An educational appliance, comprising a relatively soft artificial tooth adapted to be cut by dental instruments, and a suitable support for said tooth, said support having a flat base, substantially as described.

7. An educational appliance, comprising an artificial jaw provided with a flexible gum, and a plurality of teeth having roots embedded in said gum, whereby said teeth are yieldingly held in position but may be wedged apart, substantially as and for the purpose specified.

CHARLES F. BRYANT.

Witnesses:
JOHN L. JACKSON,
HELEN M. COLLIN.